July 13, 1926.
W. R. KIRKWOOD
DEMOUNTABLE CUSHION TIRE
Filed March 18, 1925
1,591,982
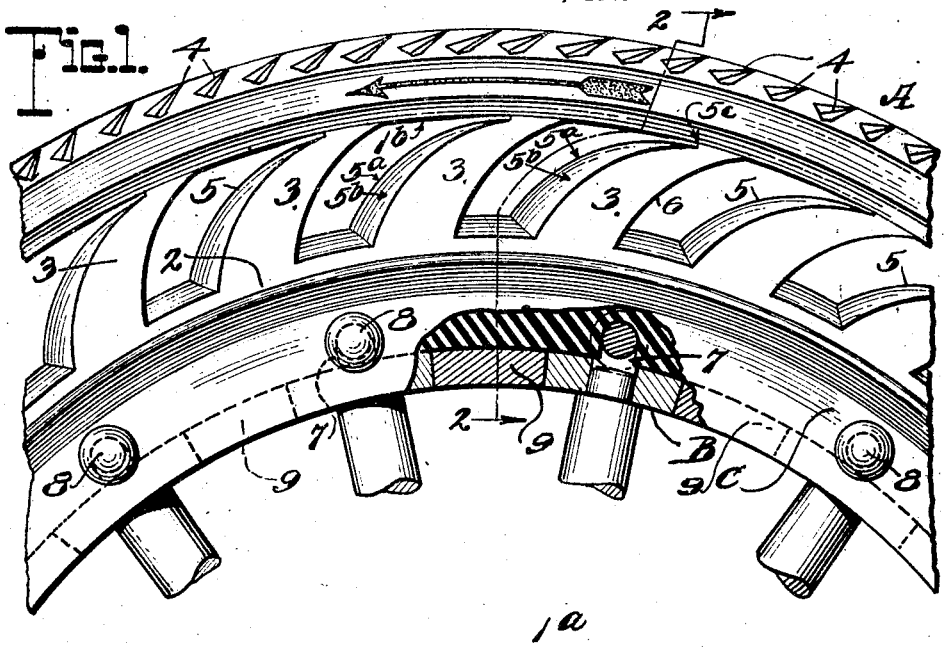
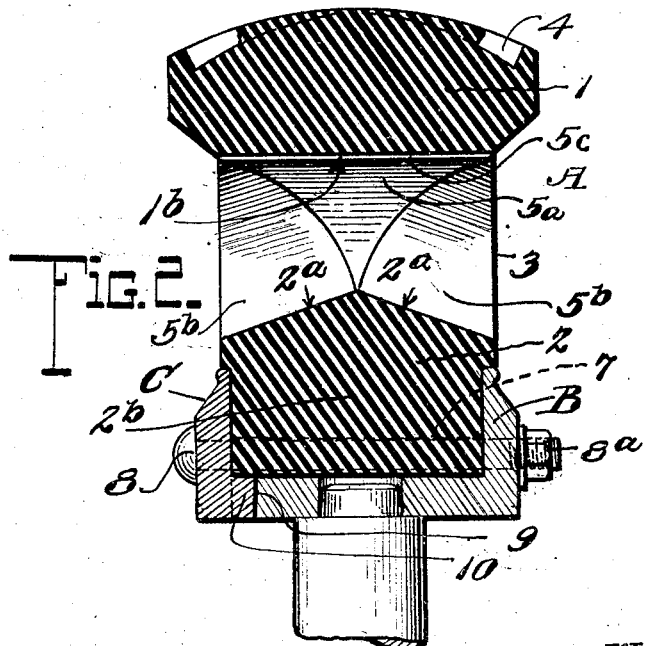
Inventor
W. R. Kirkwood
Witness:
E. H. Wagner
By Robb Robb Hill
Attorneys Patented July 13, 1926.

UNITED STATES PATENT OFFICE.

WILLIAM R. KIRKWOOD, OF PHOENIX, ARIZONA.

DEMOUNTABLE CUSHION TIRE.

Application filed March 18, 1925. Serial No. 16,437.

The present invention embodies a novel tire having the flexibility and uniform resiliency of the pneumatic type while at the same time possessing the extreme durability and strength of the solid type.

The invention has for an object to provide a tire construction that will be extremely resilient under light loads but will be capable of efficient operation under medium or heavy loads.

Another object of the invention is to provide a construction in which the tread portion of the tire is held in spaced relation with respect to the main or body portion of the tire, by a series of curved supporting arms or spokes arranged in such a manner that upon abnormal depression of the tread portion, the spokes will constitute yieldable cushions between the tread and body portions of the tire.

A further object of the invention is to provide a tire construction which may be easily and readily removed from the rim, but when applied will positively interlock therewith to prevent any rotative movement such as slipping or creeping.

Other objects and advantages of the invention will be hereinafter set forth and the novel features thereof defined by the appended claims.

In the accompanying drawing:

Figure 1 is a side elevation of a portion of a wheel showing an embodiment of my invention, parts being broken away in order to disclose more clearly some of the details of my construction; and Figure 2 is a cross sectional view taken approximately on the line 2—2 of Figure 1.

Like reference characters designate corresponding parts on the several figures of the drawing.

Referring to the drawings, A represents a demountable or removable cushion tire, constructed in accordance with my invention; B denotes a rim and combined felly; and C is the retaining flange for the tire A.

The tire A is preferably moulded or otherwise formed of rubber or suitable material and consists of a tread portion 1 supported in spaced relation from the main or body portion 2 by a series of curved tapering resilient spoke members 3.

The tread section 1 is somewhat greater in width than the rest of the tire and is provided with a non-skid tread surface 1ª having recesses or depressions 4 therein. Each of these recesses 4 is in the form of a V with its apex or point directed oppositely from the rotative direction of the wheel. By reference to Figure 1 it will be seen that this non-skid formation will greatly increase the tractive qualities of my tire when it is used on the rear or driving wheels of a vehicle.

The supporting spokes 3 for the tread section are arranged in close proximity to each other and provided with front and rear pressure surfaces 5 and 6, respectively.

The front pressure face 5 is of angular formation as seen in the drawing, actually consisting of three adjoining curved faces 5ª and 5ᵇ—5ᵇ. The main or central face 5ª is somewhat triangular in formation, its base being adjacent the tread portion and its apex adjacent the body portion. The portion of the face 5ª which is near the tread surface is normally maintained in spaced relation thereto by the slight offset 5ᶜ.

As will be seen from Figure 1, the rear pressure face 6 of each spoke 3 is a cylindrically curved surface, joining the inner face 1ᵇ of the tread section 1 at an obtuse angle. The inner surface 1ᵇ of the tread section 1 is also termed a pressure face and is cylindrically curved. As the tire is deformed these two faces contact with the same side of the spoke member.

The body portion 2 of the tire is provided with annular beveled outer faces 2ª—2ª and an inner rim-engaging portion 2ᵇ of reduced width, notched on its inner surface at intervals to provide a series of transverse recesses 7, forming lugs adapted to engage retaining bolts 8 for the side flange C of the rim B.

The combined action of the inclined or curved faces 5ª, 5ᵇ and 2ª, when the tire is compressed or deformed, causes the ejection of any dirt or mud which may be collected between the tire spokes.

The rim B consists of an L-shaped, annular felly or spoke engaging portion notched at intervals as indicated at 9 to receive the projections 10 on the retaining flange C. Suitable fastening means for securing the flange C on the rim, such as bolts 8, are provided.

A tire constructed in accordance with my invention is of such rugged and durable character that renewal is seldom necessary. For this reason the bolts 8 are placed with their nuts 8ª on the inner face of the wheel.

In use the tire is placed on the wheel to revolve in the direction indicated by the arrow in Figure 1, and the stress applied to the spokes 3 will be in an opposite direction, tending to bend them down against the body portion. Under slight loads very little deformation will occur. However, when the tread portion 1 is forced inward, either by an obstruction or increased load, the spokes 3 will be bent or arched and tensioned. Where the deformation is slight this flexibility will produce an extremely resilient tire.

Upon further deformation the pressure surface 1ᵇ of the tread section will engage the pressure faces 5ª of the spoke face 5, thereby shortening its effective lever arm; and as the deformation is further increased the area of the pressure face 5ª of the spoke 3 in contact with the tread pressure face 1ᵇ becomes greater. If the spokes are sufficiently bent or curved by the deformation, a portion of each of the rear faces 6 of the spokes 3 will rest upon the front face 5ª of the succeeding spoke, thus materially increasing the load-carrying facilities of the tire.

Upon maximum deformation it will therefore be understood that the spokes 3 are forced down against their succeeding spokes causing an overlapping of the pressure faces 6 and 5 of adjacent spokes by their contact with each other and with a portion of the beveled faces 2ª of the body portion and 1ᵇ of the tread section, when the spokes will constitute rubber cushions between the tread and body portions.

While in the deformed position any lateral pressure or force is distributed to one of the annularly disposed bevel faces 2ª and its adjoining face 5ᵇ of the spoke 3, and is absorbed by the resilient material. It will therefore be seen that the spokes function as resilient arms supporting the tread section under normal operating conditions but under certain conditions these spokes are caused to overlap, producing a series of solid rubber cushions between the tread and body portions.

While the specific construction of my invention has been herein shown and described, it is to be understood that changes and alterations may be made therein without departing from the spirit of the invention as defined by the following claims.

Having thus described my invention, what I claim as new and desire to secure by Letters Patent is:

1. A cushion tire construction, comprising a body of resilient material having openings cut laterally therethrough at regular intervals to thereby form flexible spokes or webs intermediate rim and tread portions, the wall of the respective openings constituting the forward face of each web being beveled laterally on a taper to provide deflecting faces extending from the tread portion to the rim portion and increasing in width toward said rim portion.

2. A cushion tire construction comprising a body of resilient material having openings cut laterally therethrough at regular intervals to thereby form flexible spokes or webs intermediate rim and tread portions, one wall of each opening having a cylindrical pressure receiving surface and an angularly related deflecting face.

3. A cushion tire construction comprising a body of resilient material having openings cut laterally therethrough at regular intervals to thereby form flexible spokes or webs intermediate rim and tread portions, one wall of each opening having a cylindrical pressure receiving face tapering from the tread portion toward the rim portion, and a coacting oppositely tapering deflecting surface.

4. A cushion tire construction comprising a body of resilient material having openings cut laterally therethrough at regular intervals on an angle to the radius of the tire to thereby form flexible spokes or webs intermediate rim and tread portions, the outer portion of one opening overlapping the inner portion of the next opening, the base of each opening and a face of each web being beveled laterally to provide opposing deflecting surfaces for ejecting to either side material tending to adhere in and fill the openings upon deformation of the tire, the deflecting surfaces of the web faces being of less width at the tread portion than at the rim portion.

5. A cushion tire construction comprising a body of resilient material having arcuate openings cut laterally therethrough at regular intervals to thereby form flexible spokes or webs intermediate rim and tread portions tapering toward the tread portion, the respective forward and outer wall of each opening consisting of a cylindrical pressure face and the inner and rear walls respectively of each opening having deflecting surfaces formed by beveling said walls oppositely toward each side.

In testimony whereof I affix my signature.

WILLIAM R. KIRKWOOD.